Aug. 29, 1961  H. C. VERYSER  2,997,926
METAL WORKING MACHINE
Filed Feb. 13, 1959  4 Sheets-Sheet 1

INVENTOR.
Harry C. Veryser.
BY
Elmer Jamison Gray
ATTORNEY.

INVENTOR.
Harry C. Veryser.
BY
Elmer Jamison Gray
ATTORNEY.

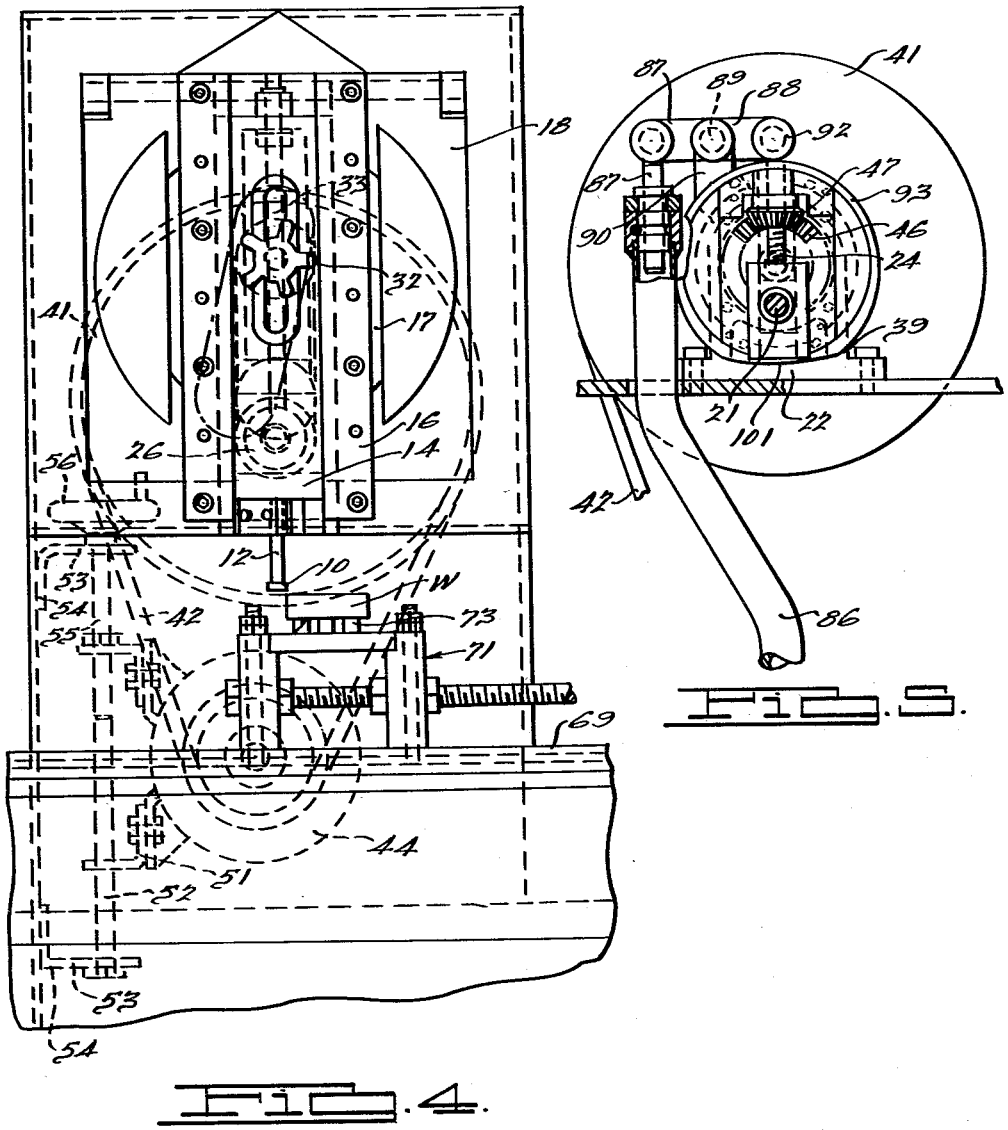

Aug. 29, 1961   H. C. VERYSER   2,997,926
METAL WORKING MACHINE
Filed Feb. 13, 1959   4 Sheets-Sheet 4
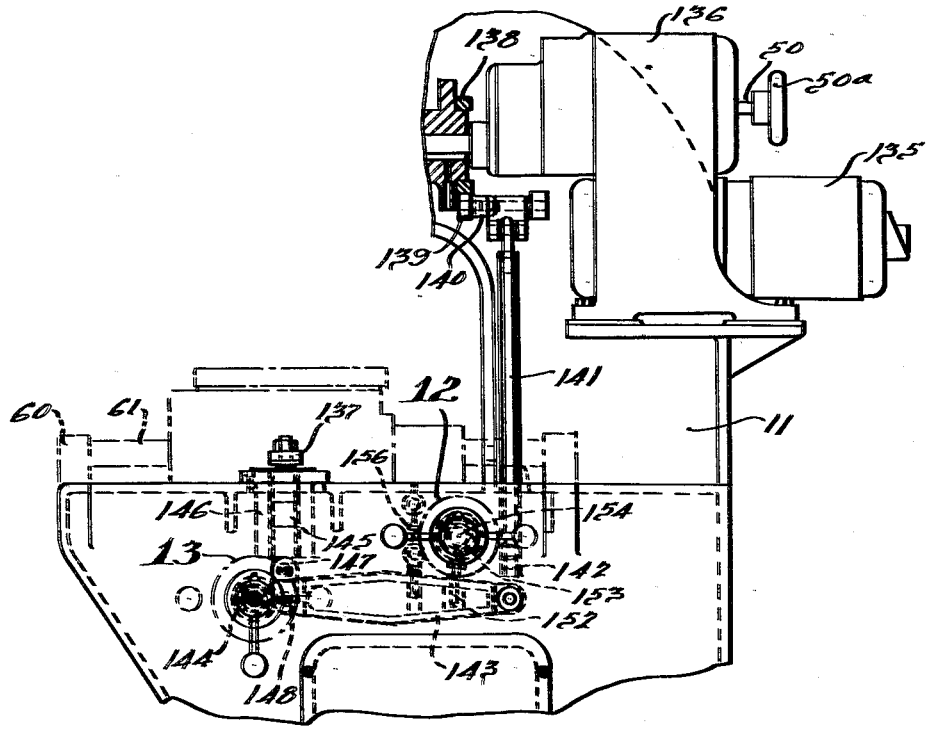
FIG. 6
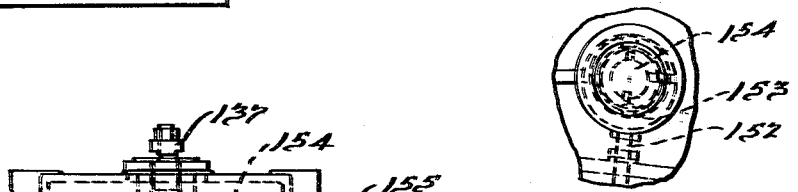
FIG. 7
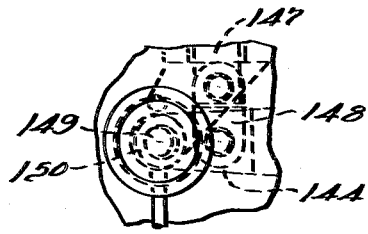
FIG. 8
FIG. 9
INVENTOR.
*Harry C. Veryser.*
BY
*Elmer Jamison Gray*
ATTORNEY.

United States Patent Office 2,997,926
Patented Aug. 29, 1961

2,997,926
METAL WORKING MACHINE
Harry C. Veryser, 27759 Greenwich,
Mount Clemens, Mich.
Filed Feb. 13, 1959, Ser. No. 793,216
6 Claims. (Cl. 90—24.3)

This invention relates to a class of machines known as shapers and more particularly to a vertical shaper equipped with a duplicating device for reproducing contours of templates when making, blanking and trimming dies, punches and the like.

Often in the production of dies, punches and the like, the structural configuration of the article to be produced is such that the only practical machine on which the required shaping operation can be performed is a vertical shaper. The conventional vertical shaper comprises a base structure supporting a reciprocating tool head, the tool head reciprocating in a substantially vertical plane. On the base in front of the column and below the tool head the shaper may be provided with a carriage movable inwardly and outwardly with respect to the column. Mounted on this carriage may be a second carriage movable in a direction at right angles to the direction of movement of the first carriage. The second carriage may be surmounted by a rotatably movable table. When a machine having the foregoing structural characteristics is used to make, blank or trim a die, punch or the like, conventional practice is to scribe on the surface of the workpiece blank the outline of the irregular shape to be produced. The workpiece is then mounted on the machine table and is fed to the cutting tool by a multiplicity of minute adjustments of the carriages and rotating table relative to one another and to the tool head. If the pattern to be produced is a particularly intricate one the operation of the carriage and rotatable table positioning devices becomes exceedingly tedious. Further, in attempting to follow a scribed line which may not be too visible frequent errors are made. Frequently, the result of much effort is only an article which still requires honing, polishing or grinding operations to bring it to the desired degree of perfection.

It is an object of the present invention to provide a vertical shaper on which template means may be utilized to control the production of dies, punches, and the like which have irregular surfaces. More particularly, the object of the invention is to provide a vertical shaper wherein a work part and a master part or pattern are attached in fixed relationship to one another on a compound carriage structure wherein at least the carriage which is movable inwardly and outwardly relative to the column and to the tool head is freely movable in a horizontal plane so that the work may be placed in contact with the cutting tool while the contour of the master part or template is traversed along and around a stationary follower adjustably carried by the machine tool head, whereby the cutting tool will shape the work to the same contour as that of the master part or template. With the workpiece mounted on a compound carriage structure which includes a carriage member movable freely in an inwardly and outwardly direction, it will be readily apparent that the shock of the reciprocating cutting tool engaging the surface of the work would normally tend in the workpiece being kicked away from the cutting tool. An important feature of the present invention is the provision of means for locking the freely movable table during that major portion of the cutting stroke and the retracting stroke of the cutting tool when the same is in engagement with the workpiece surface. The present invention provides a novel and improved means of applying sufficient pressure to a portion of the freely movable carriage member to cause that portion of the carriage member to frictionally bind against a surface of the shaper base. The actuation of the pressure means is in synchronism with the reciprocation of the cutting tool so that during a major portion of the cutting and retracting stroke of the cutting tool the work tables are frozen against movement, yet are unfrozen for a sufficient time interval to permit the necessary movement to accommodate the surface variations controlled by the template.

It is also an object of the invention to provide an improved vertical shaper as set forth in the preceding paragraph which is simple and substantial in construction, economical to manufacture, and thoroughly efficient and practical in use.

Other objects and features of this invention will appear in the following description and appended claims, reference being had to the accompanying drawings forming a part of the specification wherein like reference characters designate corresponding parts in the several views.

FIG. 4 is an enlarged fragmentary front elevation of a portion of FIG. 1.

FIG. 5 is a vertical section taken substantially along the line 5—5 of FIG. 2 looking in the direction of the arrows.

FIG. 6 is a fragmentary side elevation illustrating a modification of the present invention.

FIG. 7 is a fragmentary front elevation of a portion of the structure shown in FIG. 6.

FIG. 8 is a fragmentary enlarged view of the structure shown within the circle 12 in FIG. 6.

FIG. 9 is an enlarged fragmentary view of the portion of the structure shown within the circle 13 in FIG. 10.

Figures 1, 3:
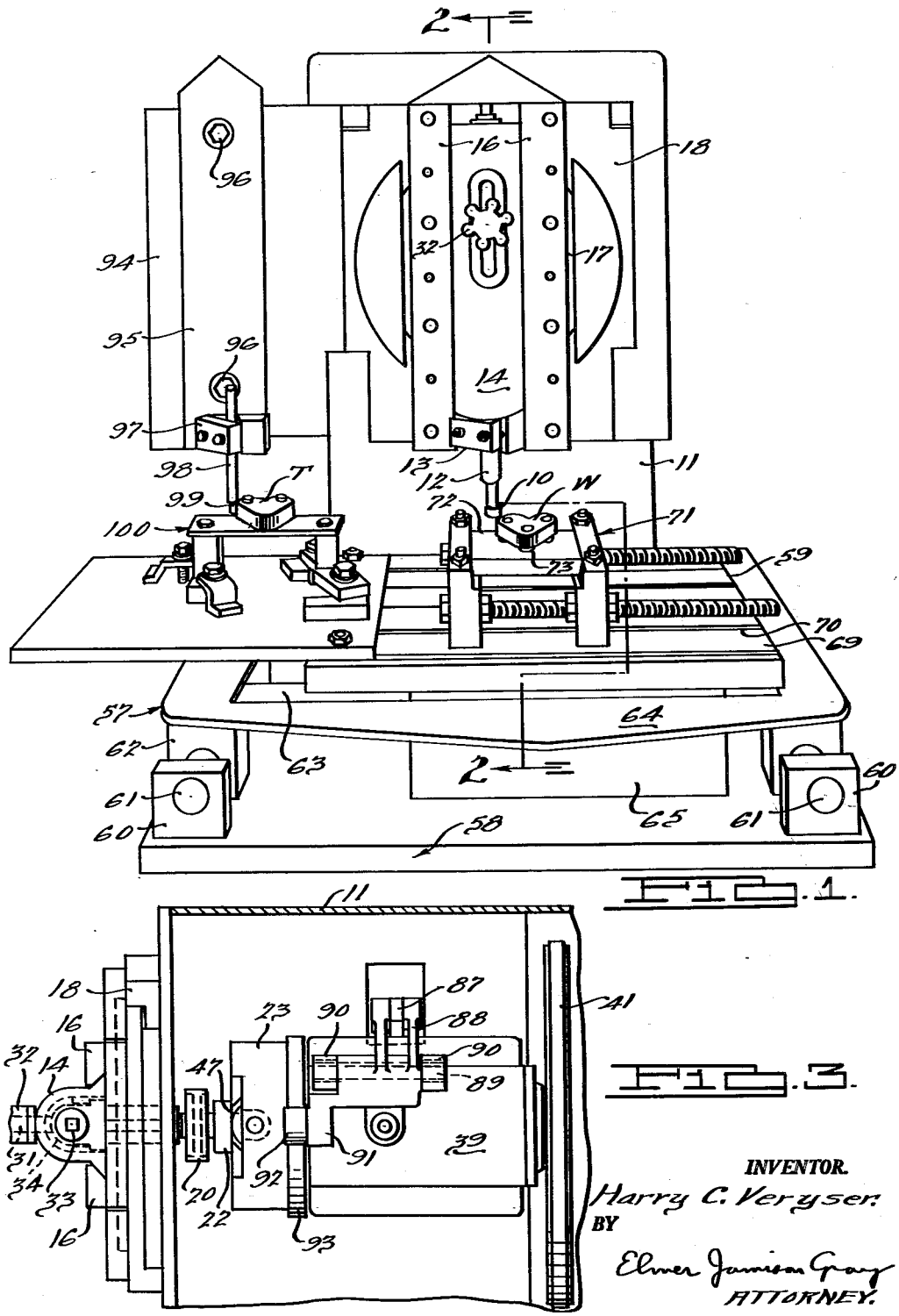
FIG. 1 is a front perspective view of a vertical shaper illustrating one embodiment of the present invention constructed in accordance with the principles thereof.
FIG. 3 is a fragmentary top elevation of the head portion of the machine taken substantially along the line 3—3 in FIG. 2 looking in the direction of the arrows.

Before explaining in detail the present invention it is to be understood that the invention is not limited in its application to the details of construction and arrangement of parts illustrated in the accompanying drawings, since the invention is capable of other embodiments, and of being practiced or carried out in various ways. Also it is to be understood that the phraseology or terminology employed herein is for the purpose of description and not of limitation.

This application is a continuation in part of my application Serial No. 463,908, filed October 22, 1954, now abandoned.

In the drawings there is illustrated, by way of example, particular embodiments of the present invention as applied to the cutting or shaping of a metal blank to conform to the shape of a master or template. Generally stated, the machine adapted for carrying out the present invention is a vertical shaper. Referring first to FIGS. 1 to 5 inclusive, the details of construction of the embodiment of the invention therein illustrated are as follows:

The manner in which the cutting tool 10 is mounted for reciprocatory motion on the column 11 of the machine follows conventional practice for the type of machine herein illustrated and will be described in general terms.

The shank 12 of the cutting tool 10 is held by a clamp plate 13 to the lower end of vertically slidable member 14, commonly termed a ram. The term 14 is mounted for vertical reciprocatory movement on a slide plate 15, the ram 14 being held to the slide plate and guided in its movement by gib plates 16 bolted to the slide plate.

The slide plate 16 in turn is mounted for swivelling movment about a ring 17 carried by a hinged mounting plate 18. The mounting plate 18 is hinged at its upper edge to a metal plate member or boss 19 integral with the front face of the column 11. It will be noted that the column 11 is of hollow construction and contains the mechanism for reciprocating the ram 14 and cutting tool 10.

Figure 2:
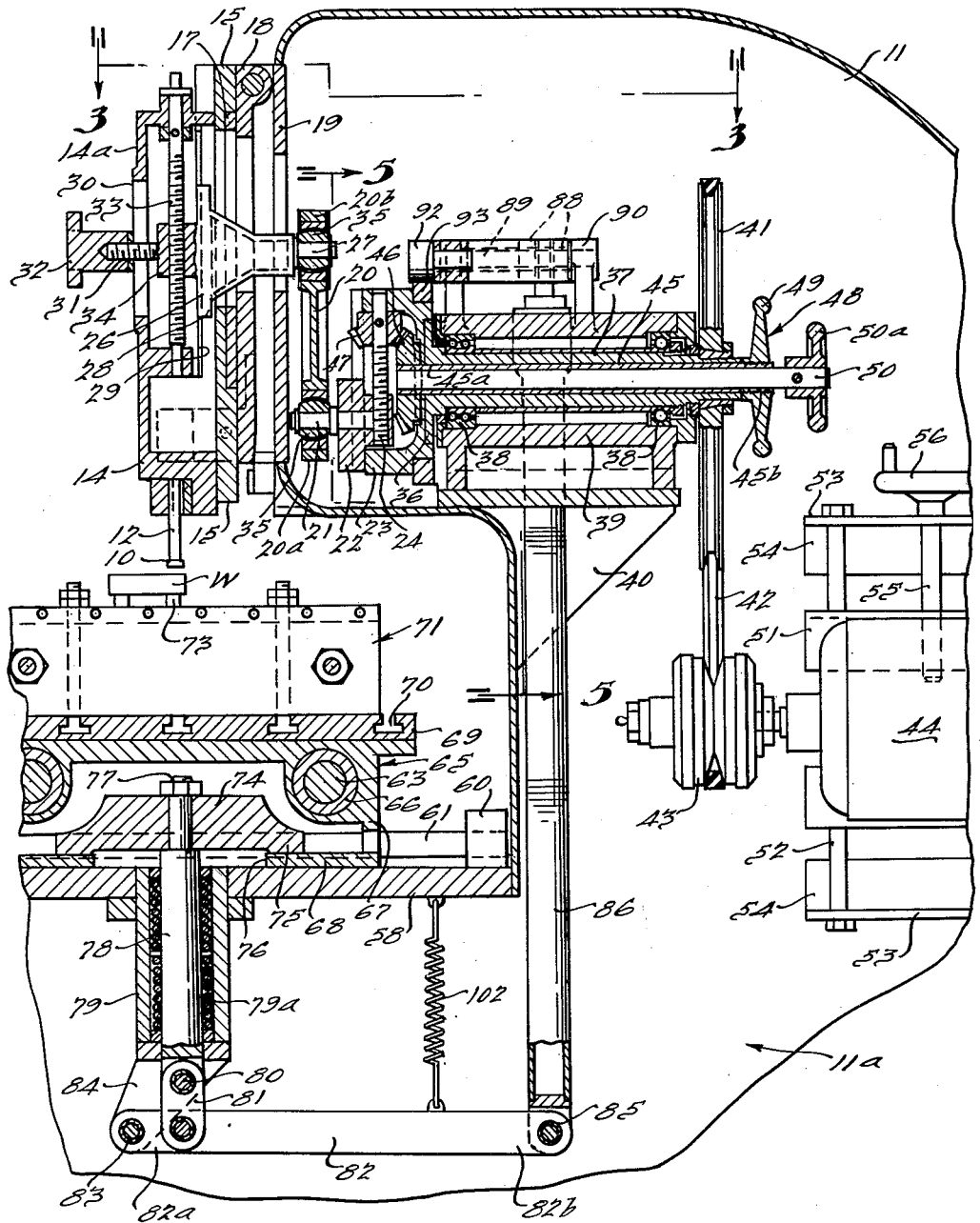
FIG. 2 is a vertical section taken along the line 2—2 of FIG. 1 looking in the direction of the arrows.

As shown in FIG. 2, the ram reciprocating mechanism comprises a crank arm 20 connected at its lower end 20a to a crank pin 21 carried by a movable pin block 22 adjustably mounted in a slotted face plate 23. A transverse screw 24 is provided to adjust the pin block 22 transversely of the face plate 23 to vary the crank throw. The crank arm 20 is connected at its upper end 20b to a combination crosshead and clamp member 26, the crosshead having a pin portion 27 integral with one end thereof. The crosshead 26 is a conical shaped member having a flanged portion 28 seated against an embossed portion 29 of the ram 14. It will be understood that the various supporting plates such as the plate 19, mounting plate 18 and slide plate 15 are slotted to provide clearance for the crosshead 26 during its reciprocable movement by the crank arm 20. The front face 14a of the ram 14 is provided with a slotted boss 30 through which a threaded stud portion 31 of the crosshead 26 projects. The threaded stud portion 31 carries a clamp knob 32. Appropriate tightening of the knob 32 results in the ram 14 being clamped between the knob and crosshead flange 28 so that the ram is rendered immovable relative to the crosshead. An adjusting screw 33 is provided for adjusting the ram 14 relatively to the crosshead 26, the screw 33 being secured against longitudinal movement relative to the ram and being threaded through a cylindrical portion 34 of the crosshead 26. This adjustment is provided to enable adjustment to be made of the initial starting position of the cutting tool stroke.

It will be noted that the rocker arm 20 is provided with spherical bearings 35 at the points at which it is connected to the crosshead pin portion 27 and to the pin 21. The sperical bearings 35 are provided to a permit the crank arm 20 to tilt to accommodate the angular displacement of the crosshead resulting from the hinged mounting plate 18 being set at an angle when it is desired to have the cutting tool operate in other than a vertical plane.

The face plate 23 is supported by being securely fastened to the flange 36 of a hollow shaft 37. The shaft 37 is journalled in bearings 38 carried in a shaft support 39 mounted on a bracket 40 welded to the column 11. At its right end as viewed in FIG. 2 the shaft 37 has keyed thereto a driven pulley 41 connected by a belt 42 to the driving pulley 43 of an electric motor 44.

The shaft 37, which has been described as hollow, carries therewithin a second tubular shaft 45 which at it left end 45a carries a bevel gear 46. The gear 46 is in mesh with a bevel gear 47 pinned to the adjusting screw 24 for adjusting the pin block 22 relative to the center of rotation of the face plate 23. At its right end 45b the shaft 45 is externally threaded to carry a lock nut 48 having hand grip portions 49. The lock nut 48 is adapted to engage the adjacent end of the hollow shaft 37 and to pull the bevel gear 46 tightly against the flanged portion 36 of the shaft 37. When so held, the shaft 45 rotates in unison with the shaft 37 and no rotary motion is imparted to the adjusting screw 24. If the locking device 48 is loosened so as to unclamp the shaft 45 from the shaft 37, the shaft 45 may be rotated relative to the shaft 37 by means of a knob 50a carried on the end of rod 50 extending through the shaft 45 and pinned to the latter and gear 47. Thus, the bevel gear 47 may be rotated relative to the face plate 23 and may therefore impart rotary motion to the bevel gear 46 pinned to the adjusting screw 24. Upon appropriate rotation of gear 46, the adjusting screw 24 may be turned to move the pin block 22 in either direction toward or away from the axis of rotation of the face plate 23 to vary the throw of the crank arm 20 and thereby vary the stroke of the cutting tool.

The electric driving motor 44 is mounted so as to be vertically adjustable to facilitate the maintenance of proper tension on the pulley belt 42. The base 51 of the motor is slidably mounted on vertically extending parallel rods 52 forming a track. The rods 52 are secured to the horizontal flanges 53 of angle members or brackets 54. The brackets 54 are secured in spaced relationship on the inner walls of the column 11. An adjusting screw 55 having a hand crank 56 is journalled into the upper horizontal flange 53 and is threaded into the motor base 51. Appropriate turning movement of the crank permits the motor 44 to be raised or lowered as desired to regulate the tension on the pulley belt 42.

The work carriage of the present embodiment on which the workpiece W is adapted to be supported primarily is made up of two superimposed units. The bottom carriage unit, generally designated 57, is movable on the table 58 of the machine toward and from the machine column 11. The table 58 is integral with the lower portion of column 11 and both comprise the base structure of the machine generally indicated at 11a. The upper carriage unit, generally designated 59, is movable on the carriage unit 57 laterally across the front of the column 11. As shown in FIGS. 1 and 2, the table 58 is provided with spaced support blocks 60 supporting rails in the form of elongated rods 61. The rods 61 run from the front of the machine toward the machine column 11. Supported on the guide rods 61 are four spaced slide blocks 62, the front two and the rear two (not shown) respectively supporting elongated rails or rods 63 extending transversely of the rods 61. The slide blocks 62 are held in spaced parallel relationship by a plate member 64 shown in FIG. 1. The plate member 64 is cut away in the center thereof to provide clearance for a box-like member 65.

The member 65 is provided with suitable wall sections bored therethrough, the bores being lined with suitable bushings or bearing members 66 to provide bearing surfaces slidable on the guide rods 63. The side walls 67 of the box-like member 65 extend downwardly substantially toward the table top 58. A centrally apertured plate 68 is securely fastened as by welding to the bottom edges of the side walls 67. The clearance between the bottom of the plate 68 and the top of the table 58 is only sufficient to permit the plate to slide freely over the table top. In other words, the clearance between the two surfaces is only sufficient to provide a sliding fit. The importance of this will become apparent.

The upper surface of the box-like member 65 has secured thereto a bolster plate 69 having T-bolt slots 70 extending across the face thereof. The T-bolt slots 70 are adapted to receive hold down bolts for bolting a work supporting fixture 71 to the bolster plate 69. In the illustrated embodiment of the workpiece W is bolted a work supporting plate 72 of the fixture 71, suitable spacers 73 being proved to space the workpiece W from the plate 72 to permit the cutting tool 10 to take a cutting stroke slightly longer than the thickness of the workpiece being shaped.

An important feature of construction of the present invention is the provision of a means for holding the work supporting carriage units 57 and 59, against movement during the cutting stroke of the tool. This means comprises a device for exerting sufficient pressure on the base plate 68 of the box-like member 65 to cause the same to bind against the table top 58.

The device for exerting pressure on the plate 68 comprises a pressure plate 74 having a base portion 75 overlying the plate 68 at the edges of an aperture 76 therein. The pressure plate 74 is centrally apertured to receive the threaded end portion 77 of a pull-down stud 78. The stud 78 is slidably journalled within a cylindrical housing 79 having bearing means 79a therewithin, the housing projecting downwardly from the under surface of the table 58. The lower end of the stud 78 has a pin and clevix connection 80 with the upper end of a short link 81, the lower end of the link being pivotally connected to a substantially horizontal extending link or arm 82. The arm 82 is fulcrumed at the left end 82a thereof on a pin 83 journalled in a bracket 84 extending downwardly from the lower end of the housing 79. At its right end 82b the link 82 has a pin and clevix connection 85 with the lower end of a substantially vertically extending actuating rod 86. The actuating rod 86 is suitably and pivotally connected at 87 to a rocker arm 88 journalled on a shaft 89 mounted in support arms 90 extending from the shaft support 39.

A second rocker arm 91 is integral with the first rocker arm 88 and extends in a direction opposite thereto. At its free end the rocker arm 91 has journalled thereon a cam follower 92 adapted to engage a cam 93. The cam 93 is mounted on the peripheral surface of the face plate 23 and is rotatable therewith.

Referring again to FIG. 1, it will be noted that mounting plate 18 has secured thereto an extension 94. The extension 94 has a plate member 95 secured thereto by bolt means 96, suitable provision being made to permit vertical adjustment of plate member 95 relative to extension 94 as desired. At the lower end thereof the plate 95 is provided with a clamp device 97 adapted to receive a template follower 98. The lower end 99 of the follower is provided with a generated surface approximating the lower end or cutting edge of the cutting tool 10. A template T is supported on the upper carriage unit 59 by any suitable support means, generally designated 100.

The operation of the present embodiment of the invention will now be described, it being assumed that it is desired to reproduce on a workpiece W the surface shown on a template T. With the template T properly supported in position relative to the follower 98 and the workpiece W properly supported in position relative to the cutting tool 10, the driving mechanism of the machine is put into operation. As has been explained, the plate member 64, and thus the bolster plate 69, is freely movable toward and from the column 11 on the guide rods 61 and in a lateral direction on the guide rods 63. By the exertion of the proper manual pressure on the plate member it is possible to keep the template T against the bearing surface 99 of the follower 98. Thus, as the ram 14 reciprocates up and down causing the cutting tool 10 to be moved up and down, the cutting tool 10 will cut a surface on the workpiece W corresponding to the surface on the template T. However, since the plate member 64 is freely movable in an in and out direction and also laterally, it is necessary that an important feature of the present invention be called into play during a substantial portion of the cutting and retracting storkes of the cutting tool 10. The feature referred to is the means for holding the plate member 64 against movement in either of its two directions of movement during a major portion of the cutting and retraction of the cutting tool. Since the cam 93 and the mechanism for reciprocating the ram 14 both derive their actuation from the same shaft, shaft 37, the rotation of cam 93 and the reciprocation of the ram 14 are in synchronism. The cam 93 is provided with a low or dwell spot 101 thereon. When the follower 92 is opposite the low or dwell spot 101 on the cam the actuating rod 86, which is related to the follower 92 through the rocker arms 88 and 91, is in its relatively high position, spring means 102 being provided to normally urge the actuating rod 86 upwardly. This means that the pressure plate 74 is not exerting any downward pressure on the plate 68 tending to bind said plate 68 against the upper surface 58 of the table. However as soon as the low spot 101 on the cam surfaces is past, the actuating rod 86 is pushed downwardly through the medium of the rocker arms 88 and 91, thereby causing the stud 78 to be pulled downwardly and pulling the pressure plate 74 into tight engagement with the plate 68 of the box-like member 65. As has been stated, the clearance between the lower surface of the plate 68 and the upper surface of the table 58 is relatively minute, being measurable in the thousandths of an inch. Guide rods 61 and 63 have been described as being elongated. In other words, the guide rods 61 and 63 are of considerable length in relation to their diameters and when plate 74 exerts a downward pressure on plate 68 the rods 61 and 63 will be bendingly deflected downwardly a sufficient amount for plate 68 to frictionally bind against table 58. Thus, the template T and workpiece W will be held against any movement. This binding action is present during most of the downward stroke of the cutting tool 10 and also during most of its upward stroke until it clears the workpiece. However, it will be understood that the dwell position 101 and the duration of the dwell may be selected as desired to allow the workpiece and template to be released at any time during the cycle and for any part of the cycle. Normally, the time interval during which the table 64 is free to be moved is so slight that the degree of movement possible is of a relatively small magnitude. Thus, each cutting stroke of the cutting tool will be barely perceptibly displaced from the preceding cutting stroke. In actual practice it has been found that it is possible to obtain the surface of the workpiece having the appearance of a highly machined surface. The quality of surface finish obtained is such that normally no further finishing operation or, at the most, only a light polishing operation is required to obtain the desired result.

The embodiment of the invention illustrated in FIGS. 6 to 9 inclusive adds several refinements to the embodiment of FIGS. 1 to 5 inclusive. It will be noted that the drive unit has a different appearance from that shown in FIG. 2. However, it is believed sufficient to merely state that the present unit is a conventional self-contained variable speed mechanism, comprising an electric motor 135 and gear box 136. Structurally, only the belt drive of the embodiment of FIGS. 1 to 5 inclusive has been eliminated.

The major refinements of the present embodiment relate to the pressure plate means and the mechanism for actuating the same. In the previously described embodiment of FIGS. 1 to 5 inclusive, the pressure plate 74 was always effective to lock the carriages against movement during the major portion of the cutting and retracting stroke of the tool.

In the present embodiment, a means has been provided for selectively rendering the pressure plate, herein designated 137, inoperative to lock the carriages against movement. Before describing this means in detail, a description of the means for actuating the pressure plate is as follows: A cam device 138 is provided which is in operative engagement with a follower 139 carried on a rocker arm 140. The rocker arm 140 in turn is operatively connected to a downwardly extending link 141. The link 141 is pivotally connected at the lower end 142 thereof to a substantially horizontally extending beam 143 pivoted at one end 144 on the base of the machine. The pressure plate 137 is carried on the upper end of a stud or vertically extending shaft 145 journalled in a boss 146 in the base of the machine. The lower end 147 of the stud or shaft 145 is connected by linkage 148 to the beam 143 at a point intermediate the pivot axis thereof and the point of connection of the beam to the vertically extending member 141. Upon the vertically extending member 141 being urged downwardly through the intersection of the cam 138 and follower 139, the beam 143 is swung downwardly causing the pressure plate 137 to be pulled downwardly. This results in the pressure plate locking the work supporting table or carriage against movement during a substantial portion of the cutting stroke and the retracting stroke thereof. In the present embodiment this action may be interrupted in two ways.

First, the pivotal mounting of the beam end 144 is on an eccentric portion 150 of shaft 149.

The shaft 149 is actuatable or rotatable by a handle 151 accessible at the side of the machine. The shaft 149 may be rotated so as to carry its eccentric portion 150 thereon to a position in which the pivot axis of the beam 143 is raised. By raising the pivot axis of the beam the pressure plate 137 is effected in that, even though the pressure plate might continue to move up and down, it does not contact the plate (68 or 120) of the carriage units so as to cause the same to move into tight engagement with the top of the table surface.

The provision of the foregoing means for rendering the pressure plate inoperative to lock the table is particularly advantageous in setting up the machine. As has been described earlier, the setting up of the workpiece involves the alignment of a scribed line on the surface thereof with the edge of the cutting tool. In so doing it will be apparent that it will be necessary to move the cutting tool up and down. With the pressure plate inoperative, the table may be freely moved to facilitate the alignment of the workpiece thereon regardless of the position of the cutting tool in its cutting or retracting stroke.

During the operation of the machine there may be times when it is desired to traverse the workpiece across the cutting tool in a straight line to finish a straight surface. The present embodiment is provided with means for locking the carriage unit against movement during the cutting and retracting stroke of the cutting tool. It will be noted that the beam 143 is provided with an adjusting screw 152 near the end thereof at which the beam is pivotally connected to the vertically extending member 141 forming a part of the rocker arm mechanism. The adjusting screw 152 is operatively related to a cam 153 which is carried on a shaft 154, the shaft 154 having a handle 155 accessible at the side of the machine for rotating the same. By rotating the shaft 154 to cause the cam 153 to exert a downward pressure on the adjusting screw 152, the beam 153 is urged downwardly against the upper pole of a spring 156. When the beam 143 is held in a downward position, the pressure plate is also held in a downward position causing the carriage unit to be locked against movement relative to the machine table 58.

I claim:

1. A metal shaping machine comprising a base structure, a cutting tool operatively supported on said base structure, drive means for imparting a cutting and retracting stroke to said cutting tool, superimposed carriage units mounted on said base structure for supporting a workpiece in position to be operated upon by said cutting tool, the lower of said carriage units being freely movable relative to a horizontal surface of said base structure in one direction of movement and adapted for movement toward said horizontal surface in binding relation thereto, a pressure member disposed entirely above and overlying said lower carriage unit, and means including a member extending vertically through a portion of said base structure and shiftable in a vertical direction by said drive means in synchronism with the cutting and retracting stroke of said cutting tool for drawing down said pressure member against said portion of the lower carriage unit and thereby displacing the latter toward said horizontal surface and causing the same to frictionally bind thereagainst during a portion of said stroke.

2. A metal shaping machine comprising a base structure having a horizontal surface, a cutting tool operatively supported on said base structure, drive means for imparting a cutting and retracting stroke to said cutting tool, superimposed carriage units mounted on said base structure for supporting a workpiece in position to be operated upon by said cutting tool, the lower of said carriage units being freely movable relative to said base structure in a plane parallel to said horizontal surface, mounting means comprising deflectable members carried by said base structure for supporting said lower carriage unit for such movement, a pressure member disposed entirely above and overlying a portion of said lower carriage unit, and means actuated by said drive means and shiftable thereby in a vertical direction for imparting bending deflection to said deflectable members during a portion of the cutting tool stroke and to draw down said pressure member and cause the same to displace said portion of the lower carriage unit into binding relation to said horizontal surface of the base structure.

3. A metal shaping machine comprising a base having an upper horizontal surface, a cutting tool operatively supported on said base, drive means for imparting cutting and retracting strokes to said tool, a carriage unit for supporting a workpiece in operative relation to said tool and having a lower portion provided with a horizontal surface overlying said upper horizontal surface in close parallel relation thereto and normally movable freely relative thereto, a pressure member disposed entirely above and overlying said lower portion, and means including a member extending vertically through a portion of said base and shiftable in a vertical direction by said drive means at predetermined times for depressing said pressure member against said lower portion and causing the same to force said horizontal surfaces into relatively immovable frictional binding relation.

4. A metal shaping machine comprising a base structure, a cutting tool operatively supported on said base structure, drive means for imparting a cutting and retracting stroke to said cutting tool, superimposed carriage units mounted on said base structure for supporting a workpiece in position to be operated upon by said cutting tool, at least the lower of said carriage units being freely movable relative to said base structure in a plane parallel to a horizontal surface of said base structure, mounting means comprising deflectable members carried by said base structure for supporting said lower carriage unit for such movement and also for enabling movement thereof toward said horizontal surface, a pressure member disposed entirely above and overlying said lower carriage unit, and means movable in synchronism with the cutting and retracting stroke of said cutting tool and shiftable by the drive means in a vertical direction for imparting bending deflection to said deflectable members during a portion of said stroke and also cause said pressure member to move the lower carriage unit toward said base structure and to immovably bind against said horizontal surface of the base structure.

5. In a metal shaping machine, a base structure, template follower means and a reciprocable cutting tool mounted in predetermined relationship on said base structure, a template and workpiece supporting carriage, deflectable members for mounting said carriage on said base structure, said carriage being freely movable in a direction in which said template and said workpiece are engageable by said template follower and cutting tool, respectively, clamping means for clamping said carriage and base structure together including a clamping portion on said carriage disposed in close relation to a horizontal surface on said base structure and adapted to engage said base upon deflection of said members, a power driven mechanism including means for reciprocating said tool to impart a cutting stroke and a retracting stroke thereto, pressure means including means for deflecting said members and a member disposed above and overlying said clamping portion for forcing said portion against said base as said members are deflected, and means actuated by said power driven mechanism in timed relation to said reciprocating means for actuating said pressure means at each cutting stroke, thereby to clamp said carriage to said surface and render said carriage immovable relative to said base structure during said cutting stroke and to release said carriage from said base structure at a predetermined time between cutting strokes of the tool to permit free movement of the carriage relative to the base structure.

6. In a metal shaping machine, a base, template follower means and a reciprocable cutting tool mounted in predetermined relationship on said base, a template and workpiece supporting carriage mounted adjacent a horizontal surface on said base, said carriage being freely movable in a direction in which said template and said workpiece are engageable by said template follower and cutting tool, respectively, clamping means for clamping said carriage and base together including a clamping portion carried by said carriage adapted for movement toward said horizontal surface, a power driven mechanism including means for reciprocating said tool to impart a cutting stroke and a retracting stroke thereto, control means including a member disposed entirely above and overlying said clamping portion and shiftable in a vertical direction by said power driven mechanism in timed relationship to said reciprocating means for moving said clamping portion downwardly into engagement with said horizontal surface thereby to clamp said carriage to said surface by frictional engagement therewith and render said carriage immovable relative to said base during said cutting stroke, said control means being effective to release said carriage from said base at a predetermined time between cutting strokes of the tool to permit free movement of the carriage relative to the base.

References Cited in the file of this patent

UNITED STATES PATENTS

| | | |
|---|---|---|
| 1,306,266 | Luster | June 10, 1919 |
| 1,397,771 | Mort | Nov. 22, 1921 |